United States Patent [19]

Iwasaki et al.

[11] Patent Number: 4,589,215
[45] Date of Patent: May 20, 1986

[54] APPARATUS FOR AFTER-TREATING POLYOLEFIN POWDER

[75] Inventors: Masamitsu Iwasaki; Takeshi Suzuki; Takashi Koizumi, all of Ichiharashi; Takehiko Takahashi; Kazumasa Shibata, both of Chibashi; Nobutoshi Komori; Atsuyoshi Shimizu, both of Ichiharashi, all of Japan

[73] Assignee: Chisso Corporation, Osaka, Japan

[21] Appl. No.: 671,605

[22] Filed: Nov. 14, 1984

[30] Foreign Application Priority Data

Nov. 24, 1983 [JP] Japan .............................. 58-221163

[51] Int. Cl.$^4$ ............................................. F26B 17/20
[52] U.S. Cl. ........................................... 34/182; 34/183
[58] Field of Search ................. 366/316, 327; 34/181, 34/182, 183

[56] References Cited

U.S. PATENT DOCUMENTS

| | | | |
|---|---|---|---|
| 66,487 | 7/1867 | Gregg | 366/327 |
| 3,247,021 | 4/1966 | Steele et al. | 366/327 |
| 3,425,135 | 2/1969 | Lang-Setmo et al. | 34/182 |
| 4,276,701 | 7/1981 | Takacs et al. | 34/182 |
| 4,420,892 | 12/1983 | Braun et al. | 34/182 |

Primary Examiner—Larry I. Schwartz
Attorney, Agent, or Firm—Fred Philpitt

[57] ABSTRACT

Devolatilization of sticky polyolefin powder and deactivation of catalyst residue can be carried out efficiently and sufficiently without the need for accompanying facilities commonly used in the treatment of powdery products in an apparatus comprising (a) a horizontal cylindrical body, (b) a stirrer provided with one revolving shaft and a plurality of specified stirring blades (c) an inlet pipe for introducing untreated polyolefin power and heating gas, (d) a variable barrage for controlling the holding amount of polyolefin powder insides of said horizontal cylindrical body, (e) an outlet way for discharging after-treated polyolefin powder and gas, (f) inlet pipes for heating gas having a pipe for feeding an after-treating agent, and (g) indirect heating mean.

5 Claims, 8 Drawing Figures

APPARATUS FOR AFTER-TREATING POLYOLEFIN POWDER

BACKGROUND OF THE INVENTION

1. Field of the Invention

This invention relates to an apparatus for after-treating polyolefin powder. More particularly, it relates to a horizontal and cylindrically shaped apparatus for after-treating polyolefin powder, which is suitable for carrying out at a low speed, such after-treatments as devolatilization of and deactivation of catalyst residue or the like in sticky polyolefin powder after completion of polymerization.

On account of the recent advanced high activity catalysts for olefin polymerization, the amount of use of a catalyst is reduced and operation for removing a catalyst after completion of polymerization has become omissible. Thus gas phase polymerization process and bulk polymerization in which after-treatment process is simple, is being watched with keen interest. However, even when the removal of catalyst residue is considered unnecessary because the amount is small, activity is still remaining in the catalyst residue included in the polyolefin powder after completion of polymerization, and hence it is necessary to stabilize the catalyst residue by deactivation. Further, a very small amount of a monomer or a solvent which has entered a polymerization vessel together with a monomer or a catalyst at the time of their addition is still remaining even in the polyolefin powder obtained in a gas phase polymerization or a bulk polymerization process, and devolatilization of these materials is necessary. Accordingly, even when removal of catalyst residue is unnecessary, after-treatment is required for the purpose of deactivation of the catalyst and devolatilization of a monomer and the like.

2. Description of the Prior Art

As conventional after-treatment apparatuses for polyolefin powder, following driers have been commonly used.

(i) A type of driers which receive heat from hot wind, such as flush drier, fluidized layer drier and the like.

(ii) Horizontal double axial paddle type driers provided with an indirect heating apparatus such as jacket, paddle and the like.

(iii) Middle or high speed revolving type, horizontal uniaxial driers (number of revolution of 200 r.p.m. or more) in which both the indirect heating with a jacket and the direct heating by hot wind are simultaneously used.

However, when the powder of a copolymer e.g. propylene-ethylene copolymer, propylene-butene copolymer, having a high comonomer content is subject to an after-treatment by using such a drier as above-mentioned, there have been following problems on account of the stickiness and extremely low fluidity of the powder.

(i) When a type of a drier receiving heat from hot wind is used, fluidization of sticky polyolefin powder by hot wind is difficult, and both devolatilization and deactivation of catalyst have been insufficient.

(ii) When a horizontal double axial paddle type drier is used, sticky polyolefin powder does not flow depending upon a kind of paddle blades. Further, since polyolefin powder severely adheres to the heating surface of paddles and is rotated together with the paddle, neither stirring effect nor transportation of the olefin powder takes place. Further, in an advanced state of adhesion of polyolefin powder, a motor for driving paddle blades is often over-loaded.

(iii) When a middle or high speed revolving horizontal type uniaxial drier is used, although temperature rises even with sticky polyolefin powder, since the holding amount of powder insides the drier is small and the powder passes through the drier within a short period of time, it requires many driers to insure a holding time necessary and satisfactory for devolatilization as well as deactivation of catalyst residue. Thus practical use in commercial scale was extremely uneconomical. Further, even in case of horizontal uniaxial driers, those of double ribbon type or flat paddle blade type can hardly be used economically in commercial scale due to the severe adhesion of powder to stirring blades or to a revolving shaft.

An object of the present invention is to provide an apparatus for after-treatment of polyolefin powder, which is not only free from such drawbacks above-mentioned conventional driers but also is provided with superior properties required for an after-treatment apparatus for polyolefin powder, particularly, such superior properties as capability of fully conducting deactivation of catalyst included in powder, devolatilization of very small amount of solvent, monomer, oligomer, volatile catalyst decomposition product, etc. even in case of sticky polyolefin powder.

SUMMARY OF THE PRESENT INVENTION

One aspect of the apparatus for after-treating polyolefin powder according to the present invention which is to attain the above-mentioned object is characterized in comprising following constitutional elements:

(a) a horizontal cylindrical body constituting a vessel for treating polyolefin powder, and having a ratio of the effective length to diameter of 3 or more, (b) a stirrer provided with one revolving shaft and a plurality of sets of stirring blades, said revolving shaft being longitudinally fitted to said horizontal cylindrical body and driven by a driving means, said plurality of sets of stirring blades being fitted to said shaft at a plurality of longitudinal positions of said shaft; each of said set consisting of 4 or less than 4 of mainly flat plate and being fitted radially along the perpendicular surface relative to said shaft in each position, each blades being inclined toward the same direction in the same set but toward the opposite directions in mutually neighbouring sets; the pitch of fitting position of each blade set being 0.3~2.0 times the width of the blade, (c) an inlet pipe for introducing untreated polyolefin powder and heating gas, provided on one end of said horizontal cylindrical body, (d) a variable barrage or weir for controlling the holding amount of polyolefin powder in the inside of said horizontal cylindrical body, provided on the other end of said horizontal cylindrical body, (e) an outlet way for discharging after-treated polyolefin powder and gas, provided on the other end of said horizontal cylindrical body, and subsequently to said variable barrage, (f) heating gas inlet pipes opening into said horizontal cylindrical body at a plurality of positions of the bottom of and along the longitudinal direction of said horizontal cylindrical body, said pipes having an after-treatment agent injection pipe attached thereto and to which an after-treatment agent feeding tube is connected, (g) an indirect heating means for heating the inside of said horizontal cylindrical body through the cylindrical wall of said horizontal cylindrical body.

Another aspect of the apparatus for after-treating polyolefin powder according to the present invention is characterized in comprising the above-mentioned constitutional elements plus (h) at least one revolving circular partition disk having an opening part for allowing the passage of polyolefin powder, and being concentrically fixed to and in mutually spaced apart relation along said revolving shaft of the stirrer to divide the inside of said horizontal cylindrical body into a plurality of small chambers.

BRIEF DESCRIPTION OF THE DRAWINGS

The apparatus of the present invention will be more fully explained by referring to the accompanying drawings.

DISCUSSION OF THE DETAILED AND PREFERRED EMBODIMENT OF THE INVENTION

Figure 1:
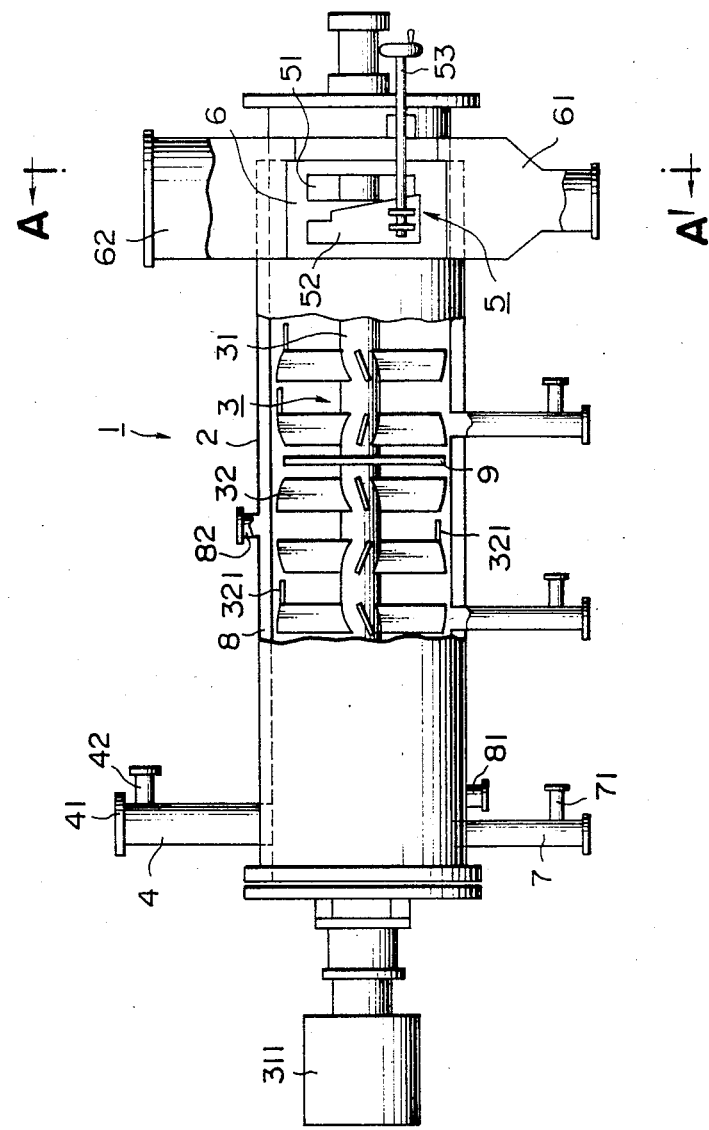
FIG. 1 is a whole side view for illustrating one example of the apparatus of the present invention including the cylindrical wall of the horizontal cylindrical body but being devoid of one part of outside wall.

In the drawings, 1 is the apparatus for after-treating polyolefin powder according to the present invention and its constitutional elements are in one aspect, 2 horizontal cylindrical body; 3 stirrer; 4 inlet pipe for powder and heating gas; 5 variable barrage; 6 discharge way for powder and gas; 7 heating gas inlet pipes having attached feeding pipes for after-treatment agent; and 8 jacket as an indirect heating means, and in another aspect, they are the above-mentioned constitutional elements plus 9 revolving circular partition disk.

Horizontal cylindrical body 2 constitutes a vessel in which untreated polyolefin powder is treated and both the ends of which are closed. The ratio (L/D) of effective length (L) and inner diameter (D) of the vessel is 3 or greater. The effective length herein means a horizontal distance between the inlet pipe 4 for powder and heating gas and an opening of barrage 51. If said ratio L/D is less than 3, discharged polyolefin powder contains short-passed polyolefin. This is undesirable because polyolefin powder which has not been devolatilize and in which catalyst residue has not been deactivated is mixed.

Figure 2:
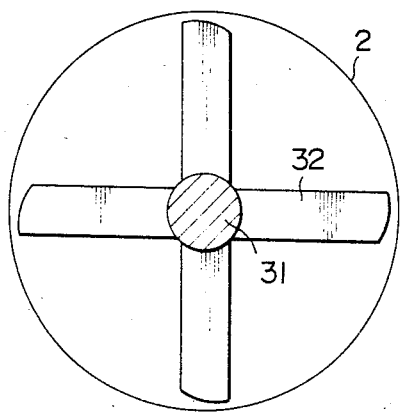
FIG. 2 is a front view showing only one set of a stirrer blade and illustrating an example in a state wherein it is attached to the revolving axis.
Figure 3:
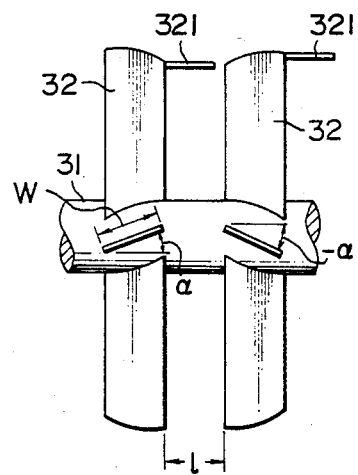
FIG. 3 is a side view illustrating only 2 sets of one exmaple of stirrer blades fitted at a certain distance of pitch and a certain inclination angles.
Figure 4A:
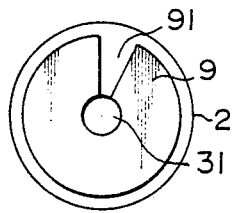
FIG. 4A–D are front view of several examples of revolving circular disks for partition fitted to the revolving shaft.
Figure 4B:
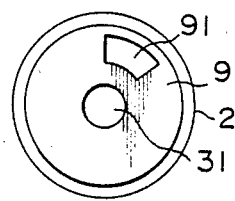
Figure 4C:
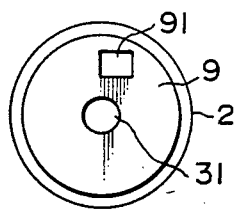
Figure 4D:
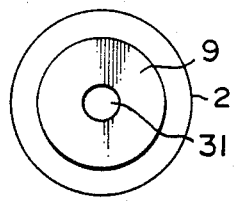
Figure 5:
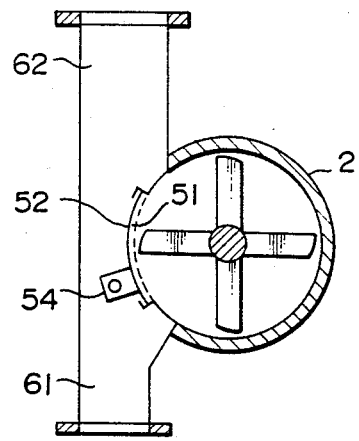
FIG. 5 is a cross-sectional view along the line A—A in FIG. 1.

The stirrer 3 consists of one revolving shaft 31 driven by a driving means 311 such as a prime mover or the like and mounted at a position of the axis of the cylindrical body in the longitudinal direction of the horizontal cylindrical body 2, and a plurality of stirring blades 32 having the following constitution. The stirrer blades 32 mainly consists of flat plates. 4 or less plates constitute one set. As shown in FIGS. 2 and 3, they are each radially fitted around the revolving shaft 31 along a plane the perpendicular to the revolving shaft 31 at a plurality of positions of the revolving shaft 31. The angles formed by two neighbouring radial stirrer blades 32 is preferably uniform such as 180°, 120° or 90°, respectively, when a set consists of 2, 3 and 4 stirrer blades. With regard to the inclination direction of the stirrer blades 32 relative to the revolving shaft 31, they are inclined toward the same direction in the same set and toward the opposite direction in the neighbouring sets. Namely, the inclination directions of every neighbouring sets are mutually inverted. This inclination angle of a stirrer blade 32 relative to the revolving shaft 31 (which are indicated in FIG. 3 as $\alpha$ and $-\alpha$) is the same in the same set, but in the neighbouring sets, the absolute values of inclination angles are the same and only the directions of inclination are opposite. It is preferable that the dimension of inclination angle is in the range of $5 \sim 85°$, most preferably of $30 \sim 60°$. If the inclination angle $\alpha$ is outsides the above-mentioned range, polyolefin powder is liable to adhere to the back surface of stirrer blades 32 or a revolving shaft 31. A plurality of sets of stirrer blade 32 are fitted one by one to the revolving shaft 31 and in a relation of a spaced apart distance l which is $0.3 \sim 2.0$ times the width W of the stirrer blade 32, as shown in FIG. 3. When this distance l is less than 0.3 times the width W of stirrer blades 32, polyolefin powder tends to adhere to the back sides of stirrer blades 32 and when it is over 2.0 times, there is formed areas where mixing with after-treating agent by stirrer blades is not performed. This is not desirable because deactivation becomes insufficient. It is preferable that the width W of the stirrer blade 32 is less than $\frac{1}{4}$ of the inner diameter D of the horizontal cylindrical body 2. The width W over the $\frac{1}{4}$ of the inner diameter D is not preferable because of the liability of sticking of polyolefin powder to the back sides of stirrer blades 32 or to the revolving axis 31. The clearance between the tip of the stirrer blade 32 and the inner wall of the horizontal cylindrical body in the range of $3 \sim 15$ mm is proper. The clearance less than 3 mm makes the fabrication difficult. The clearance over 15 mm is not desirable because polyolefin powder adheres to the inside wall of the horizontal cylindrical body 2, resulting in melting of the powder.

A stirrer blades of the following embodiment is shown as preferred example. Namely, as shown in FIG. 3, at least one of the 4 or less stirrer blade 32 in one set has on its end a raking rod 321 which is laid approximately parallel to the inside wall of the horizontal cylindrical body, with a length less than the distance between the stirrer blades 32 of neighbouring sets. As shown in FIG. 3, a stirrer blade 32 in every set is provided with a raking rods directed to the same direction and such adjacent sets may be arranged one after another. Alternatively, though not shown in the drawing, stirrer blades 32 having raking rods 321 in mutually opposite directions on both the side, are arranged e.g. on every other set so as to place at least one raking rod 321 between neighbouring sets. Since the stirrer blades 32 equipped with such raking rods 321 revolve along the inside wall of the horizontal cylindrical body 2, the adhesion of scale to the above-mentioned inner wall between the flat plates which are the bodies of the neighbouring stirrer blades 32 can be prevented.

The inlet pipe 4 for introducing powder and heating gas consists of a powder charging pipe 41 connected to powder feeding means having an air-tight structure such as a rotary valve or the like, and a heating gas feed pipe 42 connected thereto as shown in FIG. 1. It introduces untreated polyolefin powder fed from powder feeding means provided at one end of the horizontal cylindrical body 2 into the inside of a horizontal cylindrical body 2 together with a heating gas.

A variable barrage 5 consists mainly of an opening part of the barrage 51, a barrage slide plate 52 and a driving apparatus for barrage slide plate 53. More specifically, the opening part of the barrage 51 is formed by cutting off the cylinder wall of the horizontal cylindrical body 2 in a rectangular form. The barrage slide plate 52 is trapezoidal and has a structure for closing or opening the barrage opening part 51 by sliding along the cylindrical wall and provided at the end of horizontal cylindrical body 2 opposite to the inlet pipe 4 for powder and heating gas. The opened degree of the barrage opening part 51 is adjustable by moving the barrage slide plate 52 by the barrage plate driving apparatus 53 (54 is a support for barrage slide plate). Accordingly, polyolefin powder in the inside of the horizontal cylindrical body 2 can be adjusted to any holding amount. From the barrage opening part 51, after-treated polyolefin powder is discharged together with gas by overflowing as hereinafter explained.

The powder gas discharge way 6 is provided on the end part of the horizontal cylindrical body 2 on the same side with the variable barrage 5 and next to the variable barrage 5, but usually as shown in FIG. 1, as its embodiment, it is constructed so as to be consolidated into one chamber together with the variable barrage 5 and separated into a powder discharge way 61 which is directed downward from the outlet of the barrage-opening part 51 and gas discharge way 62 which is directed upward. Thus after-treated polyolefin powder and gas are discharged from the respective discharge ways in the almost separated state.

Inlet pipes 7 for heating gas, which has a feeding pipes for after-treatment agent, are provided so that they open into horizontal cylindrical body 2 at a plurality of positions at the bottom along the longitudinal direction of the horizontal cylindrical body 2, as shown in FIG. 1. To each of the inlet pipes 7 for heating gas, a feeding pipe for after-treatment agent is fitted which can open and close independently, of the inlet pipe 7 to introduce or inject a heating gas and or after-treatment agent into the inside of the horizontal cylindrical body 2 at a proper position or positions as needed. These inlet pipes for heating gas having attached a feeding pipe for after-treatment agent are preferably approximately uniformly spaced and this is preferable for controlling after-treatment condition.

The jacket 8, as indirect heating means, are provided on almost the whole surface of the outside of cylindrical wall of the horizontal cylindrical body 2. Through an inlet pipe 81 and an outlet pipe 82 for heating medium, a heating medium is passed through the jacket 8 and heats the polyolefin powder insides the horizontal cylindrical body 2 indirectly. In the present example a jacket 8 is used as indirect heating means but other means e.g. a coil of spiral tube through which a heating medium flows, can also be used.

The first aspect of the present invention consists of the above-described various elements. A revolving circular partition disk which constitutes one element of the second aspect of the present invention together with the elements of the first aspect is a disk which has a fan-shape or a square-shape opening part 91 which allows polyolefin powder to pass as shown in A, B and C of FIG. 4 or which gives wide gap between its circumference and the inside wall of the horizontal cylindrical body 2 as shown in D. At least one such disk is concentrically fitted to the revolving shaft 31 of the stirrer 3 to give partition of the inside of the horizontal cylindrical body 2 into a plurality of small chambers. It revolves together with the stirrer 3 and prevents the polyolefin powder from short passing by giving a baffle plate function to the powder flowing the inside of the horizontal cylindrical body 2. The position of this baffle plate function varies continuously and uniformly in the cross-section perpendicular to the direction of the flow of the powder. It is preferable to select the diameter of the revolving disk 9 for partition in the range of 0.5~0.95 times the inner diameter of the horizontal cylindrical body and the area of the opening part 91 in the range of 2~25% of the total area of the revolving plate 9 for partition (excluding the part of the revolving shaft 31).

The apparatus of the present invention constructed as above-mentioned is operated hereinafter described and used in the after-treatment of polyolefin powder with various kinds of effectiveness. Namely, the polyolefin powder containing catalyst (halogen-containing metal catalyst) which has been subjected to flushing of unreacted monomer after completion of polymerization is introduced into a horizontal cylindrical body 2 through a powder gas inlet pipe 4 together with heating gas fed from a heating gas feeding pipe 42. At this time, the heating gas preheats polyolefin powder before being charged in the horizontal cylindrical body 2, and at the same time, prevents the polyolefin powder from sticking to the powder gas inlet pipe 4 and causing blockade. As heating gas, heated nitrogen gas or heated regenerated gas which are regenerated from the exhaust gas from a gas exhausting pipe 62 can be used.

In a horizontal cylindrical body 2, a stirrer 3 is rotating, and direct heating by a heating gas fed from a heating gas inlet pipe 7 of the bottom part, having a feeding pipe for after-treatment agent and indirect heating by a jacket 8 are applied. The polyolefin powder introduced into the horizontal cylindrical body 2 is heated, and even sticky polyolefin powder are moved while being uniformly fluidized and stirred by the specially constructed stirrer 3 and they are sufficiently devolatilize. The heating temperature of polyolefin powder should be higher than room temperature preferably higher than 40° C., and lower than a melting point of to-be-treated polyolefin powder, preferably lower than the temperature 10° C. below the melting point. As a heating gas fed from a heating gas inlet pipe 7 provided with a feeding pipe for after-treatment agent, a heated nitrogen gas and a heated regenerated gas can be used similarily as the heating gas fed from a heating gas feeding pipe 42. The total amount of the used heating gas will be suitably in the range of 0.5~1.0 m$^3$ (normal state) per Kg. Simultaneously with the heating of polyolefin powder in a horizontal cylindrical body 2 by direct and indirect heating, an after-treatment agent is fed from a feeding pipe 71 for after-treatment agent, together with a heating gas, through a heating gas inlet pipe 7 having an after-treatment agent feeding pipe and through the bottom of the body 2 and reacts with the catalyst residue in the polyolefin powder by the stream of heating gas and stirring to deactivate and stabilizes it. The feeding of an after-treatment agent can be carried out by using all the feeding pipes for the after-treatment agent at a plurality of positions or a selected part thereof. For example, it is, therefore, possible to create a difference of concentration of after-treatment agent in the direction of advance of polyolefin powder in the inside of horizontal cylindrical body 2 by feeding an after-treatment agent only from the first after-treatment agent feeding pipe to carry out deactivation of the catalyst initially and effect only drying thereafter. The amount of feed of an after-treatment agent will be suitably 1~100 equivalent relative to the amount of unstable chlorine derived from polymerization catalyst included in polyolefin powder.

As after-treatment agents, a well known materials such as steam, oxygen, alkylene oxide, and alcohol, or mixtures of the above-mentioned materials can be used. When a horizontal cylindrical body 2 is divided into a plurality of small chambers by a revolving partition disk 9, short pass of polyolefin powder can be prevented and sufficient mixing and reaction with an after-treatment agent can be carried out. Accordingly, remarkable effect can be obtained in the deactivation of catalyst residue.

In order to give better contact of polyolefin powder with a heating gas and a treating agent in the inside of horizontal cylindrical body 2 to carry out after-treatment efficiently, the holding amount of polyolefin powder is adjusted by a variable barrage 5 so as to give a retention time of about 5 minutes–about 5 hours.

When polyolefin powder is stirred in a horizontal cylindrical body 2 together with a heating gas, adhesion of scale to the inside surface of the cylinder wall is liable to occur particularly in case of sticky polyolefin powder. When stirrer blades 32 are provided with raking rods 321 such scale is not formed.

The number of revolution of a stirrer is preferably such that the Froude number (Fr) defined by the following formula in the range of 0.1~15, particularly in the range of 0.2~10.

$$Fr = R\omega^2/g$$

In the formula R is radius of stirrer blade, $\omega$ is angular velocity and g is acceleration of gravity. When the number of flude exceeds 15, polyolefin powder is severely rotated with stirrer and the amount of discharge of such a material is increased, and the holding amount of polyolefin powder is reduced, resulting in bad efficiency of after-treatment. When the number of flude is less than 0.1, the contact between a heating gas and polyolefin powder become undesirably insufficient.

The polyolefin powder thus subjected to devolatilization and deactivation of catalyst residue comes to the end of a horizontal cylindrical body 2 and is overflown from the barrage opening part 51 of a variable barrage 5 and discharged through a powder discharge way 61. On the other hand, gas is discharged through a gas discharging way 62 and sometimes utilized as a heated regenerated gas generated by a regenerating apparatus. According to the apparatus of the present invention, the amount of heating gas fed to and discharged from a horizontal cylindrical body 2 serves the purpose with extremely small amount by simultaneously using indirect heating for heating and hence exhaust heat loss is small. Further without using a bagfilter, a cyclone or the like polyolefin powder can be caught efficiently.

According to the apparatus of the present invention, any polyolefin powder, whether it is crystalline or non-crystalline, can be after-treated excellently. As polyolefin, homo- and co-polymer of ethylene, propylene, butene-1 can be illustrated. More concretely, homopolymer of propylene, random and block copolymer of propylene with a comonomer such as ethylene and/or butene-1, homopolymer of ethylene, and copolymer ethylene with a comonomer such as propylene and/or butene-1 can be mentioned.

As above-mentioned the apparatus of the present invention provides the effectiveness in carrying out devolatilization of sticky polyolefin powder and deactivation of catalyst residue sufficiently and without the need of accompanying facilities which are commonly used in the treatment of powdery product by adopting the constitution comprising a stirrer capable of stirring polyolefin powder sufficiently, said stirrer having a structure in which a plurality of sets of stirring blades are fixed to a revolving shaft at a certain distance of pitch while the inclination angle of stirrer blade in one set is inverted from that of the neighbouring set toward the opposite direction; an indirect heating means which reduces the amount of heating gas which tends to form carry-over of polyolefin powder at when discharged; a variable barrage which regulates the holding amount of polyolefin powder which give influence upon the retention time in a vertical cylindrical body; and heating gas inlet pipes having feeding pipes for after-treatment agent, said heating gas inlet pipes feeding a heating gas from the bottom of a horizontal cylindrical body and being capable of feeding a treating agent from selected position or positions independently.

What is claimed is:

1. An apparatus for after-treating polyolefin powder comprising
   (a) a horizontal cylindrical vessel for treating polyolefin powder, said vessel having a length to diameter ratio of 3 or greater,
   (b) a stirrer mounted axially within said vessel, said stirrer comprising a plurality of sets of stirring blades mounted on a shaft, means for rotating said shaft, said plurality of sets of stirring blades being fitted to said shaft at plurality of spaced apart positions along the length of said shaft; each of said sets consisting of 4 or less mainly flat plates that are fitted radially along the shaft and perpendicular to said shaft, the blades in each set being inclined toward the same direction in the same set, but toward the opposite direction in the next adjacent set, each set of blades being spaced from the next adjacent set a distance which is 0.3–2.0 times the width of a blade in such sets,
   (c) an inlet pipe for introducing untreated polyolefin powder and heating gas, located adjacent one end of said horizontal cylindrical vessel,
   (d) A plurality of heating gas inlets positioned along the length of said vessel for the introduction of heating gas,
   (e) a variable barrage for oontrolling the amount of polyolefin powder held inside of said horizontal cylindrical vessel,
   (f) an outlet for discharging after-treated polyolefin powder and gas located adjacent to said variable barrage and at the end of said vessel which is furthest removed from said inlet end,
   (g) inlet pipes for heating gas, having attached pipes for feeding after-treating agent, said inlet pipes being provided at a plurality of positions of the bottom of and along the longitudinal direction of said horizontal cylindrical vessel, and
   (h) indirect heating means for heating the inside of said horizontal cylindrical vessel through the cylindrical wall of said horizontal cylindrical vessel.

2. An apparatus according to claim 1 wherein at least one of said stirring blades has on its outer end a raking rod which is disposed substantially parallel to the inside wall of said horizontal cylindrical vessel and has a length less than the distance between the stirrer blades of adjacent sets, at least one said raking rod extending between adjacent blade sets.

3. An apparatus according to claim 1 wherein said heating gas inlets include pipes for introducing after-treating agent, said inlets being uniformly spaced apart along the length of said vessel.

4. An apparatus according to claim 1 wherein at least one circular partition disk is concentrically fixed to said stirrer shaft to thus establish within said horizontal cylindrical vessel two or more smaller chambers.

5. An apparatus for after-treating polyolefin powder comprising
   (a) a horizontal cylindrical vessel for treating polyolefin powder, said vessel having a length to diameter ratio of 3 or greater,
   (b) a stirrer mounted axially within said vessel, said stirrer comprising a plurality of sets of stirring blades mounted on a shaft, means for rotating said shaft, said plurality of sets of stirring blades being fitted to said shaft at plurality of spaced apart positions along the length of said shaft; each of said sets consisting of 4 or less mainly flat plates that are fitted radially along the shaft and perpendicular to said shaft, the blades in each set being inclined toward the same direction in the same set, but toward the opposite direction in the next adjacent set, each set of blades being spaced from the next adjacent set a distance which is 0.3–2.0 times the width of a blade in such sets,
   (c) an inlet pipe for introducing untreated polyolefin powder and heating gas, located adjacent one end of said horizontal cylindrical vessel,
   (d) a plurality of heating gas inlets positioned along the length of said vessel for the introduction of heating gas,
   (e) a variable barrage for controlling the amount of polyolefin powder held inside of said horizontal cylindrical vessel,
   (f) an outlet for discharging after-treated polyolefin powder and gas located adjacent to said variable barrage and at the end of said vessel which is furthest removed from said inlet end,
   (g) inlet pipes for heating gas, having attached pipes for feeding after-treating agent, said inlet pipes being provided at a plurality of positions of the botton of and along the longitudinal direction of said horizontal cylindrical vessel,
   (h) indirect heating means for heating the inside of said horizontal cylindrical vessel through the cylindrical wall of said horizontal cylindrical vessel,
   (i) at least one of said stirring blades of each set having on its outer end a raking rod which is disposed substantially parallel to the inside wall of said horizontal cylindrical vessel and has a length less than the distance between the stirrer blades of adjacent sets,
   (j) said heating gas inlets including pipes for introducing after-treating agent, said inlets being uniformly spaced apart along the length of said vessel, and
   (k) at least one circular partition disk concentrically fixed to said stirrer shaft to thus establish within said horizontal cylindrical vessel two or more smaller chambers.

* * * * *